United States Patent [19]

Leftin et al.

[11] Patent Number: 4,539,310

[45] Date of Patent: Sep. 3, 1985

[54] STEAM REFORMING CATALYST

[75] Inventors: Harry P. Leftin; Kashinath Z. Patil, both of Houston, Tex.

[73] Assignee: The M. W. Kellogg Company, Houston, Tex.

[21] Appl. No.: 615,337

[22] Filed: May 30, 1984

Related U.S. Application Data

[60] Division of Ser. No. 286,427, Jul. 24, 1981, abandoned, which is a continuation-in-part of Ser. No. 117,684, Feb. 1, 1980, abandoned.

[51] Int. Cl.³ .................... B01J 21/06; B01J 23/10; B01J 23/74

[52] U.S. Cl. .................... 502/303; 502/302; 502/304

[58] Field of Search .................... 502/302, 303, 304

[56] References Cited

U.S. PATENT DOCUMENTS

| | | | |
|---|---|---|---|
| 3,650,713 | 3/1972 | Chinchen et al. | 48/214 A |
| 3,759,678 | 9/1973 | Chamberland et al. | 48/214 A |
| 4,060,498 | 11/1977 | Kawagoshi et al. | 252/373 |

*Primary Examiner*—W. J. Shine

[57] ABSTRACT

Hydrocarbon feedstocks including those containing sulfur are steam reformed in the presence of a catalyst which in the unreduced condition contains nickel oxide, rare earth metal oxide, and zirconium oxide.

4 Claims, No Drawings

STEAM REFORMING CATALYST

This is a divisional application of application Ser. No. 286,427, filed July 24, 1981, which is in turn a continuation-in-part application of application Ser. No. 117,684, filed Feb. 1, 1980, now abandoned.

This invention relates to catalytic steam reforming of hydrocarbons.

Commercial steam reforming is typically carried out in fired tubular reactors by passing hydrocarbon feed with steam and, optionally, recycle gas over nickel catalyst supported on a refractory oxide. The catalyst compositions often contain small amounts of other constituents such as other metals, rare earth metal oxides, alkali and alkali earth metal compounds and cements which, variously, enchance the catalytic effect of nickel, inhibit carbon formation on the catalyst or impart some physical property to the catalyst composition.

The product gas from steam reforming typically contains hydrogen, carbon monoxide, carbon dioxide, and methane. The presence of these components and composition of product gas is to large extent a function of particular reforming conditions as well as choice of feedstock. Depending upon the extent and type of processing following reforming, typical product gas compositions are known as hydrogen-rich gas, synthesis gas, reducing gas, and town gas which are useful for, variously, hydrodesulfurization, hydrogenation, Fischer-Tropsch synthesis, synthesis of ammonia and methanol, ore reduction, heating and power fuel, power generation from fuel cells, and other applications.

In the past, steam reforming feedstocks have been limited to sulfur-free gas containing predominantly methane and desulfurized naphthas boiling up to about 200° C. Where available, methane has been the feed of choice owing to its low steam to carbon requirement, low carbon fouling tendency, and, until recent years, low cost. Quite naturally, where methane was not readily available, the feasibility of steam reforming desulfurized liquid hydrocarbons was explored and improved catalysts were developed which, to varying degrees, could inhibit the well known tendency of liquid feeds to lay down carbon on the catalyst. More often than not, available liquids contain sulfur (as do some gas feeds) which poisons nickel in the reforming catalyst. It is generally accepted, therefore, that feedstocks must be desulfurized to less than about one part per million sulfur. Despite use of improved catalysts, it is still necessary to use higher steam to $C_1$ ratios for liquid feed than is the case for gas feed. In general, the steam to $C_1$ ratio increases with increasing average boiling point of the feed as well as with increasing proportions of the non-paraffinic constituents.

While steam reforming of desulfurized naphthas is well established commercially, the restraints of high molecular weight, often decreased paraffinic hydrocarbon content, and generally high desulfurization burden have effectively precluded use of gas oils, fuel oils, and heavier materials as reformer feedstock despite their general availability and somewhat lower cost than naphtha. While the desirability of reforming sulfur-containing feeds and/or heavy feeds has existed for many years, decreasing availability of methane and naphtha in recent years has made use of these feeds very important in most industrial countries.

It is an object of this invention to provide a hydrocarbon steam reforming catalyst and process that is useful in converting sulfur containing and/or heavy liquid feedstocks, as well as conventional feedstocks, to product gas containing hydrogen and carbon oxides.

According to the invention, a catalyst composition and process for steam reforming hydrocarbons are provided wherein hydrocarbon feed with steam is passed over a catalyst of mixed oxides which, in the unreduced condition, consists essentially of (a) from about 10 to about 60 weight percent nickel oxide in optional admixture with a minor portion of another Group VIII, fourth period metal oxide (i.e.—oxides of iron and cobalt); (b) from about 4 to about 30 weight percent of at least one oxide of the group consisting of the lanthanons and yttrium; and (c) from about 10 to about 80 weight percent zirconium dioxide optionally mixed with less than about 75 weight percent of component (c) of one or more inert oxides of the group consisting of hafnium oxide, titanium oxide, magnesium oxide, calcium oxide, and alpha-aluminum oxide. As used herein, the phrase "consists essentially of" is regarded as rendering the subsequent recital open only for the inclusion of unspecified ingredients which do not materially affect the basic and novel characteristics of the composition in contrast to the phrase "comprising" as leaving the subsequent recital open for the inclusion of unspecified ingredients even in major amounts.

The catalyst composition is composed of a plurality of oxides and does not have the unitary oxide crystal structure characteristic of perovskite and materials such as lanthanum cobaltate, $LaCoO_3$, and zirconium/rare earth metal nickelate, $Zr_x(YLaCeNdSm)NiO_y$. That is to say, apart from any crystallinity in a given constituent, the catalyst composition as a whole is substantially amorphous.

In a preferred embodiment of the invention, the catalyst components are (a) from about 20 to about 50 weight percent nickel oxide; (b) from about 10 to about 25 weight percent of one or more oxides of the lanthanons; and (c) from about 25 to about 70 weight percent zirconium dioxide.

As stated, component (a) is nickel oxide in optional admixture with cobalt or iron oxide in an amount less than about 50 weight percent of component (a). Depending upon the particular stage of manufacture or use, component (a) or part thereof may be present in equivalent elemental or sulfide conditions. The elemental condition is necessary for steam reforming activity of the catalyst and is typically brought about by treatment of oxidic or sulfided catalyst with reducing gas, a mixture of hydrogen and carbon monoxide, or preferably, a hydrogen-rich gas subsequent to charging the reforming reactor tubes with catalyst. The sulfided condition may result from a particular method of catalyst manufacture or from use of the catalyst with sulfur containing feeds. In the latter instance, an equilibrium appears to exist between sulfide and elemental conditions.

Component (b), as stated, is one or more oxides of yttrium, the rare earth metals, or mixtures thereof. The rare earth metals referred to herein are metallic elements of the lanthanide series having atomic numbers 57 through 71 commonly known as lanthanons. Of these, the oxides of lanthanum, mischmetal, didymium, or mixtures thereof are convenient and suitable constituents of component (b). The ratio of component (a) to component (b) may be from about 0.8 to about 15 and is preferably from about 1.5 to about 5.

Component (c) is preferably zirconium dioxide which has catalytic effect in combination with components (a) and (b) and, additionally functions as catalyst support. Other refractory oxides such as hafnium oxide, titanium oxide, magnesium oxide, calcium oxide, aluminum oxide, and mixtures thereof may be incorporated in the catalyst composition up to about 75 weight percent of component (c) provided that they are inert with respect to the active catalyst and are not reactive during catalyst preparation. Alpha-alumina is useful as an inert diluent for component (c), however, amorphous and other crystalline forms of alumina are not suitable. Care should be exercised in preparation to avoid spinel type structures such as nickel aluminate since these formations reduce the effective nickel content.

Additionally, the catalyst composition may contain a binding cement that is substantially inert. This may be, for example, Portland cement or low-silica aluminous cement. In general, employment of customary sintering techniques used in preparation of nickel reforming catalyst is preferred to the use of binding cement.

The catalyst may be prepared by mixing a water solution of the nitrates, acetates, sulfates, or halides of components (a), (b), and (c) in concentrations calculated to yield the specific desired catalyst within the stated ranges. These ranges for the preferred catalyst composition are (a) from about 20 to about 50 weight percent of a Group VIII, fourth period metal oxide; (b) from about 10 to 25 weight percent of one or more oxides of the lanthanons having atomic numbers 57 through 71; and (c) from about 25 to about 70 weight percent zirconium dioxide. Metallic compounds are then precipitated by treating the combined solution with sodium or ammonium hydroxide, sulfide, or carbonate. Preferably, the catalyst is prepared from water solutions of nitrates or acetates followed by precipitation with the hydroxides or carbonates of ammonia or sodium. The precipitates are repeatedly washed and filtered until no precipitating agent remains and are then dried at low temperature, for example, from about 80° to 200° C. to a moisture content dependent upon method of forming catalyst shapes. For extruded catalyst shapes, final moisture content may be from about 15 to about 60 weight percent water. For pelletized catalyst, the moisture content may be from 0 to about 25 weight percent water and the dried cake crushed to a particle size suitable for the pelletizing equipment utilized. The dried or partially dried catalyst is then pelletized or extruded as the case may be into shapes resulting, preferably, in large surface to weight ratio at a size resulting in low pressure drop of the reaction mixture through the reformer tubes. A typical catalyst shape is an annular cylinder approximately 1.5 cm. in diameter and 1.6 cm in length. The catalyst shapes are then calcined in the presence of oxygen at a temperature of from about 370° C. to about 760° to convert the metallic carbonates, sulfides, or hydroxides to plural oxides of the catalyst composition. The catalyst may then be treated with reducing gas such as hydrogen to reduce the Group VIII, fourth period metal component to elemental condition but, as previously noted, this step is preferably deferred subsequent to placement of catalyst in production equipment.

The catalyst composition of the present invention is useful in steam reforming customary feeds such as methane and naphtha to product gases previously described but is particularly useful in reforming feedstocks containing from a trace, i.e.—about 1 part per million, to about 5 weight percent sulfur which may be present in combined or uncombined form. Under steam reforming conditions, sulfur in the feedstock is converted to hydrogen sulfide which is then contained in the product gas steam. It is evident that, in the presence of hydrogen, the catalyst composition also functions as a hydrodesulfurization catalyst. Most particularly, the process and catalyst composition of the invention is useful in steam reforming normally liquid hydrocarbon feeds which may contain sulfur in the above-mentioned amount and boiling between from about $C_5$ to about 550° C. such as fuel oil and light through heavy gas oils. Other hydrocarbon feedstocks include coal liquefaction products and shale oil fractions as such or as may be contained in shale oil. Since heavy sulfur loading decreases the level of sustained catalyst activity, process economics may indicate the desirability of desulfurizing fuel and gas oil feeds, i.e.—feeds boiling from about 175° C. to about 480° C. to a sulfur level of from about 0.01 to about 0.5 weight percent which may be economically attained in commercial hydrodesulfurization units. An unreduced catalyst composition suitable for these sulfur-containing liquid feeds contains from about 20 to about 50 weight percent nickel oxide, from about 10 to about 25 weight percent rare earth metal oxide preferably lanthanum oxide, and from about 25 to about 70 percent zirconium dioxide. A particularly effective catalyst for this service will contain from about 30 to about 40 weight percent nickel oxide, from about 10 to about 20 weight percent lanthanum oxide, and the balance zirconium dioxide.

In general, customary steam reforming conditions and apparatus are used in carrying out the process of the invention. The process may be carried out at reforming pressures of from about 1 to about 50 kg/cm$^2$ absolute with reformer outlet temperatures in the range from about 500° C. to 1000° C. Suitable steam to $C_1$ ratios vary according to molecular weight of the feedstock and PONA analysis and can be as low as about 0.75 to 1 for methane and as high as about 7 to 1 for shale oil. Space velocities of the steam and hydrocarbon mixture over the catalyst composition may vary from about 1000 to about 20,000 volumes per hour per volume.

Conventional steam reforming furnaces such as described in U.S. Pat. No. 3,257,172 may be used in carrying out the process with appropriate regard to design for high boiling range feedstocks when these are used.

In Table 1 we have listed an array of catalyst compositions, including those of the present invention, intended for use in steam reforming. Catalysts are listed generally in the order of increasing nickel (or other Group VIII, 4th period metal) content.

TABLE 1

| Cat. No. (2) | Prep. (6) | (1) Catalyst Composition (Wt. % oxide) | | | |
|---|---|---|---|---|---|
| | | Group VIII, 4th per. | Lanth. | Zr. | Other |
| 1 | (d) | 8 | 4 | 88 | — |
| 2 | (a) | 19 | — | 81 | — |
| 3* | (a) | 14 | 15 | 71 | — |
| 4 | (a) | 14 | 41 | 41 | — |
| 5* | (a) | 22 | 11 | 67 | — |
| 6(3) | (h) | 24 | 10 | 33 | 33 Mg(3) |
| 7(5) | (e) | 26 | — | — | (5) |
| 8(5) | (f) | 23 | 10 | — | (5) |
| 9* | (b) | 24 | 18 | 53 | — |
| 10* | (d) | 29 | 10 | 53 | — |
| 11(3) | (a) | 36 | 15 | — | 49 Al(3) |
| 12 | (a) | 36 | 15 | — | 49 Ca |

TABLE 1-continued

| Cat. No. (2) | Prep. (6) | (1) Catalyst Composition (Wt. % oxide) | | | |
|---|---|---|---|---|---|
| | | Group VIII, 4th per. | Lanth. | Zr. | Other |
| 13* | (a) | 36 | 15 | 49 | — |
| 13A* | (b) | 36 | 15 | 49 | — |
| 14* | (a) | 36 | 15 Misch | 49 | — |
| 15* | (a) | 36 | 15 Nd | 49 | — |
| 16* | (a) | 36 | 15 Di | 49 | — |
| 17* | (a) | 36 | 15 Ce | 49 | — |
| 18* | (a) | 36 | 15 | 39 | 10 Mg |
| 19* | (a) | 36 | 15 | 39 | 10 Hf |
| 20[3] | (a) | 36 | 15 | 39 | 10 Al[3] |
| 21* | (i) | 36 | 15 | 24 | 25 ∞-Al |
| 22 | (a) | 36 Co | 15 | 49 | — |
| 23 | (a) | 36 Fe | 15 | 49 | — |
| 24* | (c) | 37 | 17 | 47 | — |
| 25* | (c) | 38 | 17 | 42 | — |
| 26* | (a) | 40 | 18 | 37 | — |
| 27* | (a) | 46 | 4 | 50 | — |
| 28[3] | (a) | 47 | 20 | — | 33 Al[3] |
| 29* | (a) | 50 | 15 | 35 | — |
| 30[4] | (g) | 68 as Ni | 32 as La | — | — |
| 31 | (a) | 70 | 30 | — | — |
| 32 | (a) | 19 | 0.2 | 80.8 | — |

Explanatory notes to Table 1 follows:

[1] The catalyst compositions are described by the nominal weight percent oxide of the metals indicated based on the total weight of the catalyst composition. Where components do not total 100%, analysis weight percents are given.
In the column headed "Group VIII, 4th period", the component is nickel oxide except as otherwise indicated. In the column headed "Lanth.", the lanthanon component is lanthanum oxide except as otherwise indicated.
[2] An asterisk following the catalyst number in the first column indicates a catalyst of the present invention.
[3] Catalyst numbers 6, 11, 20, and 28 were prepared with reactive magnesium and aluminum components as noted. Since the resulting magnesium and aluminum oxides were not inert, these catalysts are not, therefore, considered as catalyst compositions of the invention. The alumina components of catalysts 11, 20, and 28 were found by x-ray diffraction to be amorphous.
[4] Catalyst number 30 is an alloy of nickel and lanthanum.
[5] Catalyst number 7 is a commercial steam reforming catalyst designated as Girdler G 56 B nominally containing 25 weight percent nickel. Catalyst number 8 is the same catalyst impregnated with lanthanum nitrate to yield 10 weight percent lanthanum oxide in the final catalyst.
[6] The second column headed "Prep." indicates preparation method of the catalyst according to the pertinent technique following:
(a) Water solution of nitrates treated with ammonium hydroxide to coprecipitate metal hydroxides. The reaction mass was agitated during precipitation and pH maintained below about 12. Upon substantial completion of reactions, water was evaporated from the mixed precipitate and the precipitate dried at 100°–105° C. The dried precipitate was heated for two hours up to 540° C., crushed to pass a 30 mesh U.S. standard sieve, and then formed into pellets about 3 mm in length and diameter. The catalyst pellets were then calcined in the temperature range of 540° C. to 760° C.
(b) Same as (a) except that the nitrate solution was precipitated with sodium hydroxide following initial treatment with ammonium hydroxide and the mass was filtered, washed, and refiltered until no sodium was detected by platinum hot wire test.
(c) Water solution of nitrates was added to a water solution of sodium carbonate to coprecipitate metal carbonates. After filtering and washing as in (b), the remainder of technique was essentially the same as (a).
(d) Zirconium dioxide pellets were placed under vacuum and evacuated. The vacuum was released and a water solution of nickel and lanthanum nitrates added in sufficient amount to completely wet the zirconia. Excess liquid was decanted, the pellets dried at 100°–105° C. and calcined at about 540° C. The impregnation was repeated sufficient number of times to achieve the final composition and the catalyst was finally calcined at about 760° C.
(e) Commercial catalyst sample.
(f) Commercial catalyst sample impregnated with lanthanum nitrate by technique (d).
(g) Nickel—lanthanum alloy in granular form of 10 to 40 mesh.
(h) Magnesium oxide powder was added to the solution of the nitrates of nickel, lanthanum, and zirconium. Some precipitation of hydroxides of the catalyst components occurred upon initial mixing due to the alkalinity of the magnesium oxide. The remainder of the procedure was as in (a).
(i) Fused alpha aluminum oxide powder was added to the solution of the nitrates of nickel, lanthanum, and zirconium. Precipitation of the hydroxides was carried out in the presence of the suspended solid material by treatment with NH4OH. The remainder of the method is according to (a) above.

In Tables 2 through 9 we have listed steam reforming runs using the catalysts listed in Table 1. Feedstocks, reforming conditions, and results are indicated in the tables.

Normally liquid feedstock inspections are:

| Feedstock No. | F 7128 | F 7139 | F 7669 | F 6322 |
|---|---|---|---|---|
| Type | Gas Oil | Desulf. Gas Oil | No. 2 Fuel Oil | Naphtha |
| °API | 34.1 | 35.6 | 34 | 61.9 |
| Distillation: (°C.) | | | | |
| IBP | 191 | 176 | 177 | 143 |
| 20 Vol. % | 313 | 308 | 236 | 210 |
| 40 Vol. % | 333 | 330 | 256 | 232 |
| 60 Vol. % | 348 | 344 | 276 | 249 |
| 80 Vol. % | 364 | 359 | 300 | 260 |
| 95 Vol. % | 396 | 379 | 334 | 272 |
| % S | 0.41 | 0.022 | 0.27 | <0.0001 |
| % H | 13.41 | 12.42 | 13.03 | 14.89 |
| % C | 86.14 | 87.55 | 86.70 | 85.11 |

The enumerated reforming conditions are: reformer outlet temperature in ° C., reformer outlet pressure in kilograms per square centimeter, steam $C_1$ ratio which is the mole feed rate of steam divided by the mole feed rate of carbon in the hydrocarbon feedstock, and $C_1$ space velocity which is the volumes per hour of the hydrocarbon expressed as its molar equivalent on a carbon basis divided by the volume of catalyst.

Catalyst activity is indicated firstly by mole % conversion of fresh feed ($CO+CO_2$) in the reformer product gas and secondly by mole % conversion to ($CO+CO_2+CH_4$). The first indication is a direct measure of the activity of the catalyst for conversion of the feed hydrocarbon to hydrogen and carbon oxides by reaction with steam according to the well known steam reforming reactions:

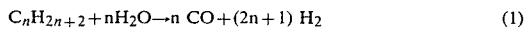

$$C_nH_{2n+2} + nH_2O \rightarrow n\ CO + (2n+1)\ H_2 \quad (1)$$

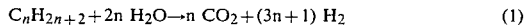

$$C_nH_{2n+2} + 2n\ H_2O \rightarrow n\ CO_2 + (3n+1)\ H_2 \quad (1)$$

The second indication is a measure of the activity of the catalyst for the conversion of the feed hydrocarbon to single carbon atom gaseous products which, in addition to the carbon oxides formed in reactions (1) and (2), includes methane produced either by destructive hydrogenolysis:

$$C_nH_{2n+2} + (n-1)H_2 \rightarrow n\ CH_4 \quad (3)$$

or by methanation:

$$CO_2 + 4H_2 \rightarrow CH_4 + 2H_2O \quad (4)$$

Net hydrogen gas production by direct conversion of the hydrocarbon feedstock with steam under the action of the catalyst of this invention is equal to that resulting from the summation of the effects of reactions (1), (2), (3) and (4).

Using the above described indications of catalyst activity, the ability of catalysts to produce hydrogen at a steady rate in the presence of sulfur compounds are measured and compared. The higher the sustained rate of conversion as described above, the better the catalyst performance.

Except for run number 804 in Table 8, all runs were carried out in a vertical reactor made of type 316 stainless steel tubing (2.54 cm diameter × 91 cm length). The reactor was heated by a Lindberg Three Zone Tubular Furnace Model 54357 at a reactor outlet temperature range of 550° C. to 900° C. Beckman pumps were used to pump feedstock and distilled water which were then metered, preheated, vaporized, mixed, and fed to the catalyst bed. Hydrogen or helium served as a carrier gas. The catalyst bed, about 7.6 cm in height and 30cc in volume, was located at the center of the reactor tube.

Prior to introduction of the feed, the catalyst Group VIII, 4th period component was converted to a substantially reduced condition by heating for several hours at 425° C. to 760° C. while maintaining a flow of hydrogen containing gas through the catalyst bed in the reactor.

Product gases from the reactor were cooled by a water condenser. At times, the product gases were cooled to 0° C. to separate solid and liquid products. When feedstocks with a low sulfur level (0.4 wt %) were used, practically no liquid or solid compounds were condensed from product gases, except unreacted water. Product gases were passed through Drierite before sampling for gas chromatograph or mass spectrometric analysis. Concentrations of hydrogen, carbon monoxide, methane, carbon dioxide, ethylene, ethane and benzene in the product gases were determined. Mole percentages of carbon monoxide, carbon dioxide, and methane were then used in calculating steam reforming activity.

Run number 804 in Table 8 was carried out in a small pilot plant unit using a catalyst bed of 45 centimeters height and 240 cubic centimeters volume. Except for operating on a large scale and at higher pressures, operating conditions were similar to those described previously.

Table 2 is a compilation of reforming runs made with catalysts containing varying proportions of the oxides of nickel, lanthanum, and zirconium. Criticality of nickel content is shown by runs 201 and 207. In these runs, catalyst no. 1 containing only 8 weight percent nickel oxide and 4 weight percent lanthanum oxide performed poorly as compared with catalyst no. 27 containing 46 weight percent nickel oxide and the same amount of lanthanum oxide. Run nos. 202 and 203 illustrate the effect of nickel-lanthanum ratios. In run no. 202, catalyst no. 4 contained 41 weight percent lanthanum oxide and 14 weight percent nickel oxide. This catalyst performed poorly compared with catalyst no. 3 in run no. 203 which contained 15 weight percent lanthanum oxide and 14 weight percent nickel oxide.

Table 3 is a compilation of reforming runs carried out with various nickel containing catalysts which are not of the present invention. In each run, a significant decline in catalyst activity within 72 hours of operation is indicated. Each of the catalysts tested in these runs does not have either a lanthanon oxide component or a zirconium dioxide component.

Table 4 is a compilation of reforming runs carried out with catalysts of the present invention and illustrates good performance with catalysts having different lanthanon constituents in combination with the same levels of nickel oxide and zirconium oxide.

Table 5 is a compilation of reforming runs carried out with catalysts containing respectively in runs 205, 501, and 502 the oxides of nickel, cobalt, and iron as the Group VIII, fourth period metal component. These runs illustrate that complete substitution of nickel with cobalt or iron result in lower levels of catalyst activity.

Table 6 is a compilation of reforming runs carried with catalysts containing, in addition to zirconium dioxide, other refractory oxides. Notably, catalyst numbers 6 and 20 in run numbers 603 and 604 contained reactive rather than inert refractory oxides and performed poorly in comparison with the others.

Table 7 is a compilation of reforming runs carried out with catalysts of the present invention prepared by four different techniques. With the exception of catalyst no. 10 in run no. 701, these catalysts were prepared by preferred coprecipitation techniques and performed well. Catalyst no. 10 was prepared by the particular impregnation technique described in explanatory note (6) (d) to Table 1.

Table 8 is a compilation of reforming runs carried out with catalysts of the present invention under different conditions of temperature and pressure. Catalyst activity was good in all instances. Run numbers 801, 802, and 803 illustrate reforming of various feedstocks at temperatures 705° C., 787° C., and 904° C. respectively. Run number 804 was carried out at higher pressure in the small pilot plant apparatus previously described. In this continuous run, initial operation up to 129 hours was carried out at a pressure of about 5.9 kg/cm$^2$ whereupon the pressure was increased to 11.4 kg/cm$^2$ and then to 25.3 kg/cm$^2$ for the time intervals shown.

Table 9 is a compilation of reforming runs carried out with catalysts of the present invention on gaseous and liquid hydrocarbon feedstocks which contain various levels of sulfur. In general, the level of catalyst activity varies inversely with sulfur content of the feedstock, however, these runs illustrate a sustained level of catalyst activity.

Table 10 is a compilation of reforming runs made with catalysts containing varying amounts of lanthanum oxide. Catalyst 5* is a catalyst of the invention containing 22 wt. % nickel oxide and 11 wt. % lanthanum oxide. Catalyst 32 is not a catalyst of the invention and contains 19 wt. % nickel oxide but only 0.2 wt. % lanthanum oxide.

In runs 908 and 910 both catalysts exhibited good activity when reforming sulfur-free naphtha at a steam/C$_1$ ratio of 3.5 to 1. However, when the steam/C$_1$ ratio was reduced to 1.4 to 1 on each of the catalysts in, respectively, runs 909 and 911, Catalyst 32 developed a pressure drop greater than 0.07031 kg/cm$^2$ indicating that the catalyst bed had plugged with carbon deposit. In contrast, Catalyst 5* continued to reform naphtha at a steady level of activity until the run was arbitrarily terminated at 34 hours.

In runs 912 and 913, Catalysts 32 and 5* were again compared but with operation on fuel oil containing 2700 ppm sulfur. Shortly after the 24 hour analyses, Catalyst 32 developed a pressure drop greater than 0.07031 kg/cm$^2$ indicating that the catalyst bed had plugged with carbon deposit. In contrast, Catalyst 5* continued to reform the fuel oil at a steady level of activity until the run was arbitrarily terminated after 72 hours.

TABLE 2

| RUN | CAT | FEEDSTOCK No. | Type | Sulfur ppm | REFORMING CONDITIONS Temp °C. | Abs. press kg/cm$^2$ | S/C$_1$ | Space Vel. | Mole % Conversion to (CO + CO$_2$) 4 hrs | 24 hrs | 72 hrs | 96 hrs | Mole % Conversion to (CO + CO$_2$ + CH$_4$) 4 hrs | 24 hrs | 72 hrs | 96 hrs |
|---|---|---|---|---|---|---|---|---|---|---|---|---|---|---|---|---|
| 201 | 1 | F 7128 | Gas Oil | 4100 | 843 | atm | 5 | 1000 | 64 | 36 | | | 79 | 51 | | |
| 202 | 4 | F 7669 | Fuel Oil | 2700 | 843 | 4.5 | 5 | 500 | 86 | 72 | | | 98 | 90 | | |
| 203 | 3* | F 7669 | Fuel Oil | 2700 | 843 | 4.5 | 5 | 500 | 84 | 80 | 75 | 74 | 97 | 95 | 92 | 91 |
| 204 | 5* | F 7128 | Gas Oil & Thiophene | 20000 | 843 | atm | 5 | 1000 | 65 | 65 | 64 | 65 | 80 | 84 | 80 | — |
| 205 | 13* | F 7128 | Gas Oil | 4100 | 843 | atm | 5 | 1000 | 84 | 82 | — | 77 | 95 | 95 | 93 | 92 |
| 206 | 25* | F 7669 | Fuel Oil | 2700 | 843 | 4.5 | 5 | 500 | 77 | 76 | 75 | 75 | 93 | 92 | 92 | 92 |
| 207 | 27* | F 7128 | Gas Oil | 4100 | 843 | atm | 5 | 1000 | 85 | 83 | 77 | | 98 | 97 | 91 | |
| 208 | 29* | F 7669 | Fuel Oil | 2700 | 843 | 4.5 | 5 | 500 | 92 | 90 | 89 | 89 | 99 | 99 | 99 | 99 |

TABLE 3

| RUN | CAT | FEEDSTOCK No. | Type | Sulfur ppm | REFORMING CONDITIONS Temp °C. | Abs. Press. kg/cm$^2$ | S/C$_1$ | Space vel. | Mole % Conversion to (CO + CO$_2$) 4 hrs | 24 hrs | 48 hrs | 72 hrs | Mole % Conversion to (CO + CO$_2$ + CH$_4$) 4 hrs | 24 hrs | 48 hrs | 72 hrs |
|---|---|---|---|---|---|---|---|---|---|---|---|---|---|---|---|---|
| 301 | 2 | F 7128 | Gas Oil + Thiophene | 20000 | 843 | atm | 5 | 1000 | 64 | 63 | 59 | 54 | 82 | 76 | 78 | 71 |
| 302 | 7 | F 7128 | Gas Oil | 4100 | 843 | atm | 5 | 1000 | 84 | 78 | 61 | | 95 | 90 | 74 | |
| 303 | 8 | F 7128 | Gas Oil | 4100 | 843 | atm | 5 | 500 | 90 | 81 | 69 | 32 | 100 | 91 | 92 | 42 |
| 304 | 12 | F 7669 | Fuel Oil | 2700 | 843 | 4.5 | 5 | 500 | 86 | 79 | 64 | 40 | 98 | 97 | 85 | 67 |
| 305 | 11 | F 7669 | Fuel Oil | 2700 | 843 | 4.5 | 5 | 500 | 94 | 49 | | | 98 | 78 | | |
| 306 | 28 | F 7669 | Fuel Oil | 2700 | 843 | 4.5 | 5 | 500 | 98 | 74 | 53 (31 hrs) | | 99 | 86 | 73 (31 hrs) | |
| 307 | 30 | F 7128 | Gas Oil | 4100 | 843 | atm | 5 | 1000 | 80 | 34 | | | 96 | 51 | | |
| 308 | 31 | F 7669 | Fuel Oil | 2700 | 843 | 4.5 | 5 | 500 | 87 | 83 | 77 (40 hrs) | | 96 | 96 | 91 (40 hrs) | |

TABLE 4

| RUN | CAT | FEEDSTOCKS No. | Type | Sulfur ppm | Temp °C. | Abs. Press. kg/cm² | S/C₁ | Space vel. | Mole % Conversion to (CO + CO₂) 4 hrs | 24 hrs | 72 hrs | Mole % Conversion to (CO + CO₂ + CH₄) 4 hrs | 24 hrs | 72 hrs |
|---|---|---|---|---|---|---|---|---|---|---|---|---|---|---|
| 401 | 14* | F 7669 | Fuel Oil | 2700 | 843 | 4.5 | 5 | 500 | 92 | 90 | 89 | 99 | 98 | 98 |
| 402 | 15* | F 7669 | Fuel Oil | 2700 | 843 | 4.5 | 5 | 500 | 88 | 87 | 84 | 98 | 97 | 97 |
| 403 | 16* | F 7669 | Fuel Oil | 2700 | 843 | 4.5 | 5 | 500 | 89 | 86 | 86 | 98 | 97 | 97 |
| 404 | 17* | F 7669 | Fuel Oil | 2700 | 843 | 4.5 | 5 | 500 | 84 | 80 | 79 | 96 | 94 | 94 |

TABLE 5

| RUN | CAT | FEEDSTOCK No. | Type | Sulfur ppm | Temp °C. | Abs. Press. kg/cm² | S/C₁ | Space vel. | Mole % Conversion to (CO + CO₂) 4 hrs | 24 hrs | 48 hrs | 96 hrs | Mole % Conversion to (CO + CO₂ + CH₄) 4 hrs | 24 hrs | 48 hrs | 96 hrs |
|---|---|---|---|---|---|---|---|---|---|---|---|---|---|---|---|---|
| 205 | 13* | F 7128 | Gas Oil | 4100 | 843 | atm | 5 | 1000 | 84 | 82 | — | 77 | 95 | 95 | 93 | 92 |
| 501 | 22 | F 7128 | Gas Oil | 4100 | 843 | atm | 5 | 1000 | 61 | 58 | 55 | | 77 | 75 | 71 | |
| 502 | 23 | F 7128 | Gas Oil | 4100 | 843 | atm | 5 | 1000 | 58 | 58 | | | 80 | 84 | 60 | |

TABLE 6

| RUN | CAT | FEEDSTOCK No. | Type | Sulfur ppm | Temp °C. | Abs. Press. kg/cm² | S/C₁ | Space vel | Mole % Conversion to (CO + CO₂) 4 hrs | 24 hrs | 72 hrs | Mole % Conversion to (CO + CO₂ + CH₄) 4 hrs | 24 hrs | 72 hrs |
|---|---|---|---|---|---|---|---|---|---|---|---|---|---|---|
| 601 | 19* | F 7669 | Fuel Oil | 2700 | 843 | 4.5 | 5 | 500 | 88 | 88 | 85 | 98 | 97 | 95 |
| 602 | 18* | F 7669 | Fuel Oil | 2700 | 843 | 4.5 | 5 | 500 | 91 | 90 | 84 | 98 | 98 | 97 |
| 603 | 6 | F 7669 | Fuel Oil | 2700 | 843 | 4.5 | 5 | 500 | 82 | 55 | | 95 | 77 | |
| 604 | 20 | F 7669 | Fuel Oil | 2700 | 843 | 4.5 | 5 | 500 | 88 | 50 | | 98 | 60 | |
| 605 | 21* | F 7669 | Fuel Oil | 2700 | 843 | 4.5 | 5-7 | 500 | 92 | 92 | 86 | 99 | 99 | 96 |

TABLE 7

| RUN | CAT | FEEDSTOCK No. | Type | Sulfur ppm | Temp °C. | Abs. Press. kg/cm² | S/C₁ | Space vel. | Mole % Conversion to (CO + CO₂) 4 hrs | 24 hrs | 72 hrs | Mole % Conversion to CO + CO₂ + CH₄ 4 hrs | 24 hrs | 72 hrs |
|---|---|---|---|---|---|---|---|---|---|---|---|---|---|---|
| 204 | 5* | F 7128 | Gas Oil & Thiophene | 20000 | 843 | atm | 5 | 1000 | 65 | 65 | 64 | 80 | 84 | 80 |
| 701 | 10* | F 7669 | Fuel Oil | 2700 | 843 | 4.5 | 5 | 500 | 80 | 64 | | 98 | 86 | |
| 702 | 24* | F 7669 | Fuel Oil | 2700 | 843 | 4.5 | 5 | 500 | 85 | 81 | 79 | 97 | 95 | 94 |
| 703 | 9* | F 7669 | Fuel Oil | 2700 | 843 | 4.5 | 5 | 500 | 90 | 86 | 81 | 98 | 97 | 95 |

TABLE 8

| RUN | CAT | FEEDSTOCK No. | Type | Sulfur ppm | Temp °C. | Abs. Press. kg/cm² | S/C₁ | Space vel. | Mole % Conversion to (CO + CO₂) 4 hrs | 24 hrs | 72 hrs | 96 hrs | Mole % Conversion to (CO + CO₂ + CH₄) 4 hrs | 24 hrs | 72 hrs | 96 hrs |
|---|---|---|---|---|---|---|---|---|---|---|---|---|---|---|---|---|
| 801 | 26* | — | CH₄ | none | 705 | atm | 3.5 | 500 | — | — | — | 98 | — | — | — | 98 |
| 802 | 26* | F 7139 | Gas Oil | 220 | 787 | 4.5 | 5 | 500 | 89 | 89 | 89 | | 99 | 99 | 99 | |
| 803 | 13* | F 7128 | Gas Oil | 4100 | 904 | atm | 5 | 500 | — | — | 88 | 88 | 100 | 100 | 100 | |
|  |  |  |  |  |  |  |  |  | 190 hrs | 390 hrs | 670 hrs | 730 hrs | 190 hrs | 390 hrs | 670 hrs | 730 hrs |
| 804 | 13A* | F 7669 | Fuel Oil | 2700 | ~890 | 11.4 | 5.7 | ~440 | 92.3 | 91.1 | | | 97.9 | 98.6 | | |
|  |  |  |  |  | ~885 | 25.3 | 5.7 | ~435 | | | 81.4 | 76.6 | | | 95.2 | 95.6 |

TABLE 9

| RUN | CAT | FEEDSTOCK No. | Type | Sulfur ppm | Temp. °C. | Abs. press. kg/cm² | S/C₁ | Space Vel. | Mole % Conversion to (CO + CO₂) 4 hrs. | 24 hrs. | 48 hrs. | 96 hrs. | Mole % Conversion to (CO + CO₂ + CH₄) 4 hrs. | 24 hrs. | 48 hrs. | 96 hrs. |
|---|---|---|---|---|---|---|---|---|---|---|---|---|---|---|---|---|
| 901 | 26* | — | CH₄ | none | 760 | atm | 3.5 | 500 | — | — | 99 | 99 | | | | |

TABLE 9-continued

| RUN | CAT | FEEDSTOCK No. | Type | Sulfur ppm | REFORMING CONDITIONS Temp. °C. | Abs. press. kg/cm² | S/C₁ | Space Vel. | Mole % Conversion to (CO + CO₂) | | | | Mole % Conversion to (CO + CO₂ + CH₄) | | | |
|---|---|---|---|---|---|---|---|---|---|---|---|---|---|---|---|---|
| 902 | 26* | — | CH₄ + H₂S | 310 | 904 | atm | 3.5 | 500 | — | 89 | 88 | 86 | | | | |
| 903 | 26* | — | CH₄ + H₂S | 1060 | 904 | atm | 3.5 | 500 | — | 64 | 64 | 65 | | | | |
| 904 | 26* | — | CH₄ + H₂S | 3220 | 904 | 4.5 | 3 | 500 | — | — | — | 55 | | | | |
| 905 | 26* | F 7669 | Fuel Oil | 2700 | 904 | atm | 5 | 500 | 91 | 91 | 91 | 91 | 97 | 100 | 98 | 97 |
| 906 | 26* | F 7139 | Gas Oil | 220 | 904 | 1.4 | 5 | 500 | 98 | 97 | 97 | | 100 | 100 | 100 | |
| 907 | 26* | F 7128 | Gas Oil | 4100 | 904 | 4.5 | 5 | 500 | 87 | 87 | 86 | | 99 | 99 | 99 | |
| 803 | 26* | F 7128 | Gas Oil | 4100 | 904 | atm | 5 | 500 | — | 88 | 89 | 88 | 100 | 100 | 100 | |
| | | | | | | | | | | | | | | | | 72 hrs. |
| 204 | 5* | F 7128 thiophene | Gas Oil + | 20000 | 843 | atm | 5 | 1000 | 65 | 65 | 65 | 65 | 80 | 84 | 78 | 72 |

TABLE 10

| RUN | CAT | FEEDSTOCK NO. | TYPE | SULFUR PPM | REFORMING CONDITIONS TEMP °C. | ABS. PRESS. Kg/cm² | S/C₁ | SPACE VEL | MOLE % CONVERSION TO (CO + CO₂) | | | MOLE % CONVERSION TO (CO + CO₂ + CH₄) | | |
|---|---|---|---|---|---|---|---|---|---|---|---|---|---|---|
| | | | | | | | | | 4 HRS | 24 HRS | 72 HRS | 4 HRS | 24 HRS | 72 HRS |
| 908 | 32 | F 6322 | Naphtha | <1 | 760 | 4.5 | 3.5 | 1000 | 78 | 78 | 78 | 96 | 96 | 96 |
| 909 | 32 | F 6322 | Naphtha | <1 | 760 | 4.5 | 1.4 | 1000 | | (a) | | | (a) | |
| 910 | 5* | F 6322 | Naphtha | <1 | 760 | 4.5 | 3.5 | 1000 | 86 | 86 | 85 | 98 | 98 | 98 |
| 911 | 5* | F 6322 | Naphtha | <1 | 760 | 4.5 | 1.4 | 1000 | 77 | 78 | (b) | 98 | 98 | (b) |
| 912 | 32 | F 7669 | Fuel Oil | 2700 | 843 | 4.5 | 5 | 500 | 70 | 65 | (c) | 94 | 91 | (c) |
| 913 | 5* | F 7669 | Fuel Oil | 2700 | 843 | 4.5 | 5 | 500 | 71 | 70 | 68 | 93 | 93 | 93 |

Footnotes to Table 10:
(a) P > .07031 km/cm² at 1.5 hrs. indicating carbon plugging
(b) No pressure drop at 34 hrs. which was end of run.
(c) P > .07031 km/cm² at approximately 25 hours indicating carbon plugging.

We claim:

1. A sulfur resistant catalyst having a plurality of oxides, for steam reforming hydrocarbons containing from about 1 part per million to about 5 weight percent sulfur, which in the unreduced condition consists essentially of:
    (a) from about 20 to about 50 weight percent nickel oxide;
    (b) from about 10 to about 25 weight percent of one or more oxides of the lanthanons having atomic numbers 57 through 71; and
    (c) from about 25 to about 70 weight percent zirconium dioxide.

2. The sulfur resistant catalyst of claim 1 wherein the oxides of the lanthanons component is lanthanum oxide.

3. The sulfur resistant catalyst of claim 1 wherein the oxides of the lanthanons are oxides of mischmetal.

4. The sulfur resistant catalyst of claim 1 wherein the oxides of the lanthanons are didymium oxide.

* * * * *